April 23, 1957 F. S. SINCLAIRE 2,789,430
CONTACT PRESSURE MEASURING APPARATUS
Filed June 25, 1954 2 Sheets-Sheet 1
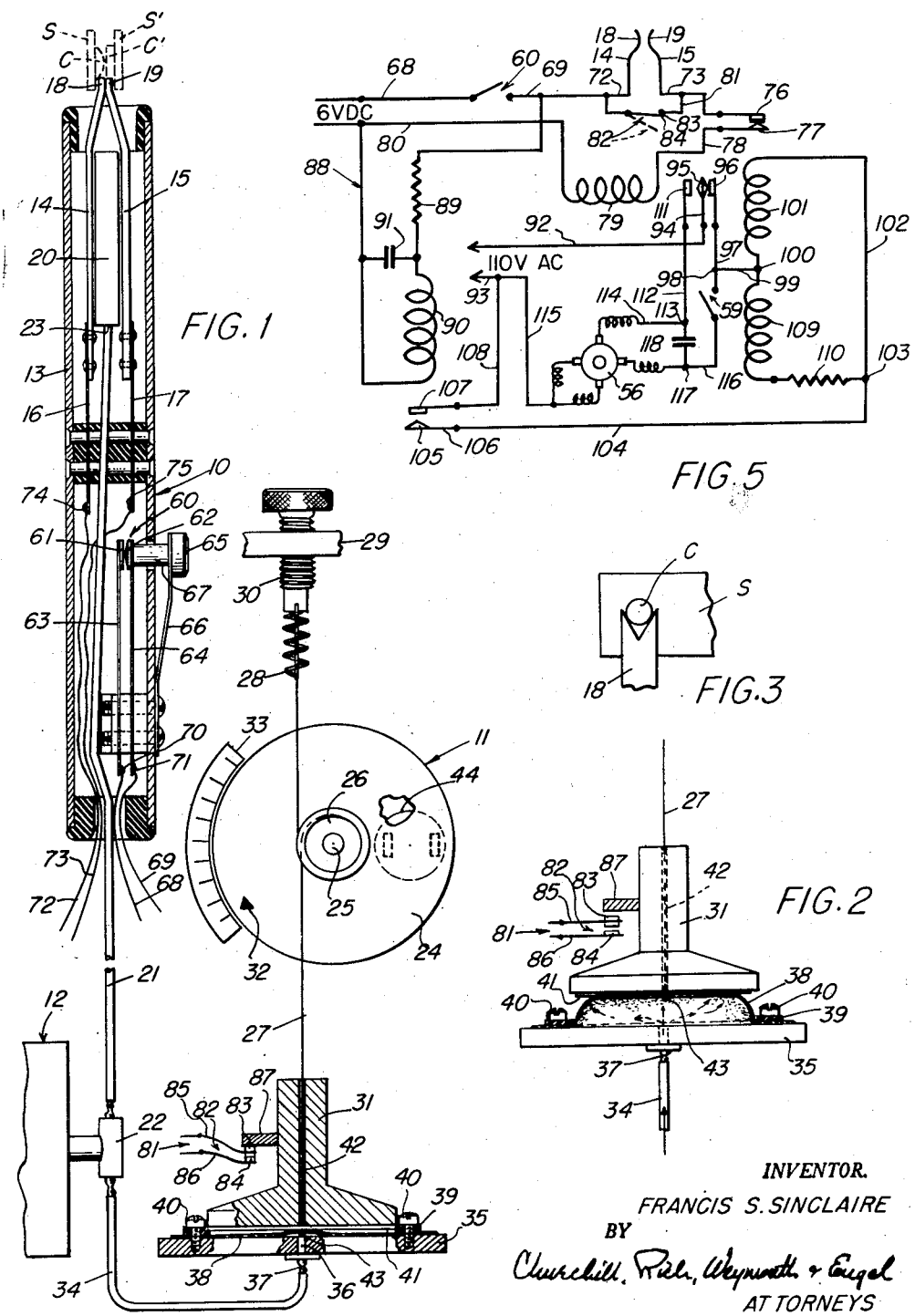
INVENTOR.
FRANCIS S. SINCLAIRE
BY
Churchill, Rich, Weymouth & Engel
ATTORNEYS April 23, 1957 F. S. SINCLAIRE 2,789,430
CONTACT PRESSURE MEASURING APPARATUS
Filed June 25, 1954 2 Sheets-Sheet 2
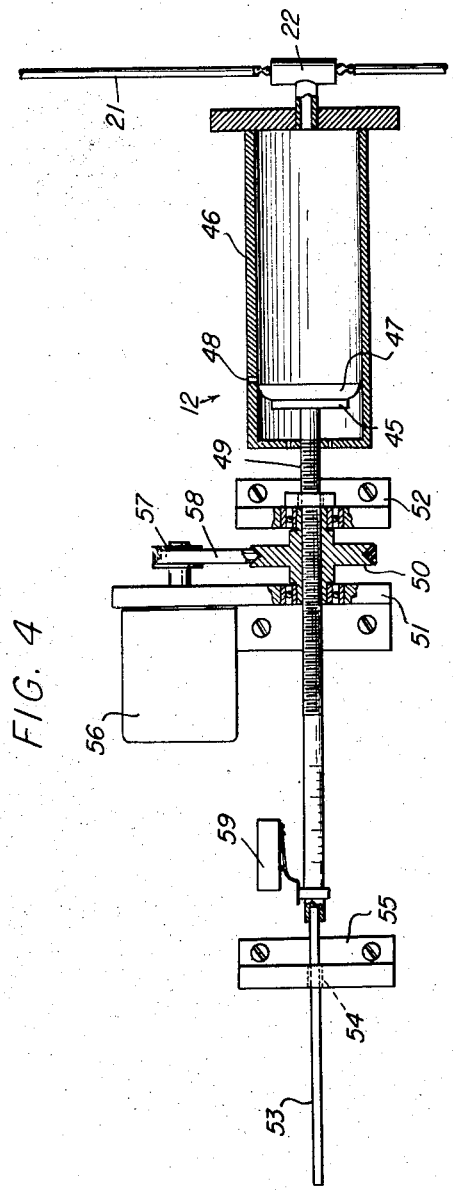
INVENTOR.
FRANCIS S. SINCLAIRE
BY
ATTORNEYS.

United States Patent Office 2,789,430
Patented Apr. 23, 1957

2,789,430

CONTACT PRESSURE MEASURING APPARATUS

Francis S. Sinclaire, Brooklyn, N. Y., assignor to Allied Control Company, Inc., New York, N. Y., a corporation of New York Application June 25, 1954, Serial No. 439,377

13 Claims. (Cl. 73—161)

This invention relates to a pressure gauge, and more particularly an automatic gauge for measuring and indicating contact pressure between two points on an apparatus. The invention is especially useful in its application to measurement of the contact pressure exerted between coacting spring leaves of an electrical switch or relay, to which use, however, it is not restricted.

Heretofore, gauges of the class described have generally been complicated in construction and operation, and have been dependent for their functioning upon the inherent qualities of springs or other fatigue-subject elements. Furthermore, such gauges have usually required momentary visual or aural observation to determine any quantitative measurements of the pressures involved. Such momentary observation often leads to operator fatigue with consequent inaccuracies in measurement. In other gauges employed for like purposes, measurement has been made of incidental or secondary results of pressure, as friction, thus multiplying independent sequence the possibility of error.

The invention provides a gauge which measures directly the contact pressure between two points and which indicates directly and automatically the measured pressure. The indicated reading is maintained until the operator releases the indicating mechanism in order to make a new measurement. Apparatus according to the invention is simple both in construction and in operation. Such gauges are not primarily dependent for their functioning upon the inherent qualities of any of their parts.

According to the invention, a probe is provided comprising a pair of fingers which may be inserted together between the supports for the points where contact pressure is exerted immediately adjacent the points. Fluid pressure is employed to separate the fingers, and an indicator, connected with this same fluid pressure, indicates this pressure. The pressure so indicated by the indicator is, of course, equal to the contact pressure between the points at the instant the points are separated. Locking means is provided for the indicator to fix its position when the points are separated. Such locking means is actuated by an electrical circuit which includes the pair of fingers and is completed through the points when the fingers are inserted between their supports adjacent to them. When the points are electrically separated the circuit is broken and the indicator is locked to show the exact pressure at which their separation takes place.

The pressure indicated by the locked indicator is thus the true pressure acting to keep the contacts closed, and an automatic pressure gauge according to the invention is independent of special fixtures, cumbersome electrical connections or visual methods of determining separation of the contacts. Furthermore, the use of fluid pressure to separate the fingers of the probe makes the measurements independent of the initial separation of the contact supports.

One embodiment of the invention is shown, by way of illustration, in its application to an automatic gauge for measuring the contact pressure between contacting spring leaves of an electrical relay in the accompanying drawings, in which:

Fig. 1 is a semi-diagrammatic view, partly in section and partly broken away, showing the apparatus;

Fig. 2 is a broken elevation, partly in section, of a part of the pressure indicating unit illustrated in Fig. 1, showing the elements thereof in the position assumed under pressure;

Fig. 3 is a fragmentary view illustrating how the contact fingers are inserted between the contact spring leaves of an electrical relay immediately adjacent the contact points thereof;

Fig. 4 is a semi-diagrammatic plan view of a complete compressor apparatus adapted for use in accordance with the invention; and Fig. 5 is a wiring diagram illustrating an electrical circuit which may be employed with the automatic gauge.

In the embodiment illustrated in the drawings, there is shown a probe generally designated 10, a pressure indicating unit generally designated 11 for indicating the pressure applied to operate the probe, and a pump or compressor unit generally designated 12 for simultaneously operating the probe and the pressure indicating unit. The pressure system is such that as the pump or compressor 12 operates the probe 10, the pressure exerted by the former upon the latter is registered by the pressure indicating unit 11.

The probe 10 is designed to separate the contact points of an electrical relay or the like by exerting sufficient force between them to overcome their contact pressure, and to control the pressure indicating unit 11 in a manner to cause it to indicate the exact pressure required to separate the points. To this end, the probe 10 comprises a hollow handle 13 within which a pair of substantially rigid electrically conductive fingers 14 and 15 are supported in substantially parallel relationship by highly flexible resilient electrically conductive arms 16 and 17, respectively, fixed within the handle 13. The free ends of the fingers 14 and 15 extend out of the handle 13 and toward one another to provide parallel probing terminals 18 and 19, respectively, which are normally in contact with one another. The thickness of the probing terminals 18 and 19, when in contact with one another, is such that they may be inserted between a pair of coacting spring leaves S and S' of a relay or switch adjacent the contact points C and C' thereof. The ends of the probing terminals may be notched, as shown in Fig. 3, in order that these terminals may be positioned as closely as possible to the contact points C and C'.

As will be obvious, a force acting to separate the probing terminals 18 and 19 against the opposing pressure exerted by the coacting spring leaves S and S' will be equal to the contact pressure between the contact points C and C' at the moment when they are separated. It is only necessary, therefore, to measure the magnitude of this force at the moment when the contact points are separated in order to measure the contact pressure.

According to the invention, fluid pressure is provided to exert the separating force between the probing terminals 18 and 19. Furthermore, it has been found convenient to use pneumatic force or air pressure for this purpose; and pneumatic pressure will hereinafter be referred to. In the embodiment here illustrated a collapsible sack or bladder 20 is positioned between the fingers 14 and 15 within the handle 13, and pneumatic pressure is applied to distend the bladder between the fingers 14 and 15 to separate the latter. Separating the fingers also separates the probing terminals and, with them, the spring leaves S and S' between which the former are inserted. Upon release of the pressure applied to the bladder 20 the latter collapses and the resiliency of the very flexible arms 16 and 17 returns the probing terminals 18 and 19 to position in contact with one another. It will be understood that the flexibility of the arms 16 and 17 is so great that the fingers 14 and 15 are substantially free floating. Thus, no appreciable resistance is added by the arms 16 and 17 to the force required to separate the contacts C and C'.

Pneumatic pressure is applied to the bladder from the pump or compressor 12 through a conduit 21 which extends from an outlet T 22 of the compressor into the handle and is connected to the bladder 20, as at 23. The pressure indicating unit 11 is also connected to the outlet T 22 of the compressor 12, in a manner later to be described, and therefore is subjected to the same pressure as is the probe 10.

As shown, the pressure indicating unit comprises a light-weight disc 24 of magnetic material centrally mounted for rotation in a vertical plane about an axle 25. A hub 26 is coaxially fixed to the disc 24 for rotation therewith about the axle 25. Wound about the hub 26 is a tension cord 27, which is attached at one end to a tension spring 28 carried by a fixed horizontal member 29 above the disc 24. So that the tension of the spring 28 may be adjusted, the spring is immediately connected to a thumb screw 30 which is threaded through the fixed horizontal member 29 for axial adjustment therein. The other end of the tension cord 27 is connected, in a manner later to be described, for movement with a weight 31 which opposes the pull of the tension spring 28 upon the cord. Accordingly, as the weight 31 is lifted, the spring 28 draws the cord 27 upwardly, thereby rotating the disc 24 in a clockwise direction, as illustrated. The mass of the weight 31 is such, however, that ordinarily it will overcome the force of the spring 28 and rotate the disc 24 in a counter-clockwise direction until the weight comes to rest. It is to be noted, however, that the function of the spring 28 is to keep the cord 27 in tension, and that the pressure indicating unit 11 is operated by displacement of the weight 31.

From the foregoing, it will be evident that the disc 24 may be employed to indicate the magnitude of any pressure which lifts the weight 31 and permits the spring 28 to rotate the disc. To this end, a pointer 32 is marked on the rim of the disc 24, and a suitable scale 33 is disposed adjacent the rim of the disc with its zero reading at the location of the pointer 32 when the weight is in its lowermost position.

The same pneumatic pressure which separates the probing terminals 18 and 19 is employed to lift the weight 31; and the scale 33 is calibrated to read this pressure with respect to the position of the pointer 32. Accordingly, a tube 34, connected to the T 22, conducts the same pressure which distends the bladder 20 beneath the weight 31 to lift it. As illustrated in Figs. 1 and 2, the weight 31 normally rests upon a base 35 having a passage 36 extending therethrough and terminating in its upper surface. The outer end of the passage 36 is provided with a nipple 37 to which the tube 34 is connected. Secured upon the upper surface of the base 35 over the end of the passage 36 and beneath the weight 31 is a thin sheet or diaphragm 38 of elastic material, as rubber. A ring 39 fixed to the base 35 by screws 40 clamps the sheet 38 peripherally upon the base and provides a seat for the weight 31. In order that the weight 31 may assume a centered seat upon the solid ring 39, which acts as a stop corresponding to zero pressure, a downwardly extending circular projection 41 is formed coaxially upon the weight, the diameter of the projection 41 being substantially that of the inside of the ring.

The tension cord 27 extends through an axial passage 42 in the weight 31 and is fixed at its lower end, as at 43 to the sheet 38 centrally of the ring 39.

Accordingly, as the pump or compressor 12 acts to supply pressure to operate the probe 10, it supplies the same pressure, through the tube 34 and the passage 36, beneath the elastic sheet 38. Such pressure moves the sheet 38 upwardly and raises the weight 31 together with the fixation point 43 of the lower end of the tension cord 27 (see Fig. 2). Furthermore, the extent to which the weight and the point 43 are raised above the base 35 is a measure of the pressure supplied by the compressor 12 beneath the sheet 38.

As the fixation point 43 rises with the weight 31, the tension spring 28 keeps the cord 27 taut, thereby rotating the disc 24 in proportion to the extent to which the weight 31 is elevated and in proportion to the magnitude of the pressure beneath it. Thus, the position of the pointer 32 with respect to the calibrated scale 33 indicates the pressure delivered by the tube 34 and by the conduit 21. An electromagnet 44, operated automatically from the probe 10 in a manner later to be described, fixes the registering position of the disc 24 at the instant when the probe 10 separates the contact points C and C'.

A variety of known or convenient types of compressor may be employed to supply pressure to the tube 34 and the conduit 21. A preferred type is illustrated in Fig. 4 of the drawings.

As here shown, the compressor 12 is a simple piston pump. A piston 45 is reciprocable in a cylinder 46 to provide pneumatic pressure in the T 22. The piston 45 carries the usual leather cup 47 and when the piston is advanced toward the T 22, pressure is generated in the cylinder which is conveyed through the T to the pobe 10 and the pressure indicating unit 11. Since the change in pressure is an exponential function with respect to volume and time, this construction tends to maintain roughly the same degree of accuracy throughout the usable range of the gauge. Reverse movement of the piston relieves such pressure, deflates the bladder 20 in the probe 10 and permits the weight 31 of the pressure indicating unit again to seat upon the ring 39. A bleeding orifice 48 in the cylinder 46 permits atmospheric pressure to be reestablished therein when the piston 45 has been fully retracted.

Known or convenient means, controlled from the probe 10, may be employed to advance or retract the piston 45 in the cylinder 46. As here shown, a threaded piston rod 49 is fixed to the piston 45 and an internally threaded pulley 50 is mounted in bearings as shown in threaded engagement with piston rod 49. A pair of fixed pillar blocks 51 and 52, one on each side of the threaded pulley 50, support said bearings and also prevent movement of the pulley axially of the piston rod 49. The end 53 of the piston rod 49 distant from its connection with the piston 45 is made rectangular for a distance equal to the stroke of the piston 45 to slide through a similarly shaped slot 54 in a fixed plate 55, thereby preventing the piston rod from turning as it is advanced and retracted. Accordingly, rotation of the internally threaded pulley 50 will move the piston rod 49 axially, advancing or retracting the piston 45 in the cylinder 46 according to the direction of rotation of the pulley 50. A reversible motor 56 is mounted on the pillar block 51, with a pulley 57 upon its shaft in line with the internally threaded pulley 50. The pulley 57 is connected with the pulley 50 by a belt 58. Thus, operation of the motor 56 in one direction advances the piston 45 in the cylinder 46 and operation of the motor in the other direction retracts the piston in the cylinder. A limit switch 59 coacting with the piston rod 49, stops the motor 56 in well known manner before the piston can overrun its retracted position, in which it clears orifice 48.

The motor 56 is controlled from the probe 10 by means of a manually-operated switch 60 comprising contacts 61 and 62 held by spring leads 63 and 64, respectively, fixed within the handle 13. A push button 65, carried by a leaf spring 66 outside of the handle, bears against contact 62 through stem 67 extending through an opening in the handle. Thus, by pressing the push button 65 toward the handle 13, the switch 60 is closed. Upon release of such pressure the switch opens. Conductors 68 and 69 are connected to the leads 63 and 64 at 70 and 71 respectively, and extend out of the handle, together with conductors 72 and 73 connected at 74 and 75, respectively, to the arms 16 and 17 and form part of a primary actuating circuit to control operation of the gauge. Such operation will now be described.

In the wiring diagram, Fig. 5, the circuits and components of the automatic gauge control system are shown. Here, the primary actuating circuit and the controlled operating circuit are both shown in normal unenergized condition, as when the probe 10 is not in use.

The primary actuating circuit, shown in part in Fig. 1, is more fully illustrated in Fig. 5. This circuit comprises a source of low voltage direct current, as 6-volt D. C., to which the conductor 68 is connected. The manually-operated switch 60, shown in open position, serves to connect the conductor 68 with the conductor 69, which is in turn connected through the conductor 72 to the finger 14 of the probe. The coacting finger 15 is connected through the conductor 73 to one contact 76 of a pair of spring-closed anti-chatter relay contacts, the other contact 77 of which is connected by a conductor 78 to one end of a trigger relay actuating coil 79, the function of which will later appear. The opposite end of the trigger relay actuating coil 79 is connected by a conductor 80 to the source of low voltage direct current.

Thus, with the probing terminals 18 and 19 of the fingers 14 and 15 in contact and the contacts 76 and 77 spring-closed, the switch 60 may be closed to energize the trigger relay actuating coil 79. By opening the switch 60, or by separating the probing terminals 18 and 19 connected in the circuit as so far described, or by separating the contacts 76 and 77, the trigger relay actuating coil may be de-energized.

It is preferred not to rely upon contact between the probing terminals 18 and 19 in order to close the primary actuating circuit. In practical use of the apparatus, dirt and dust may lodge between the terminals and prevent the circuit from being closed through them. Furthermore, the probe 10 generally will be used with relays having their spring leaves S and S' separated by a distance which requires complete separation of the terminals 18 and 19 before making contact with both of the spring leaves. Accordingly, the conductors 72 and 73 are short circuited past the fingers 14 and 15 by a shunt circuit 81 closed by a switch 82 which opens automatically when the pressure between the fingers reaches an arbitrary value, say 5 grams, which is well below the minimum pressure between closed relay contacts. Therefore, in Fig. 5 the terminals 18, 19 are shown separated. It should be noted here that the use of fluid pressure makes this device almost completely independent of any reasonable variations in the initial separation of the spring leaves. Thus, fluid pressure initially separates the contact terminals 18 and 19 to bring them into contact with the spring leaves S and S' before separation of the contact points C and C' is effected. This is important in view of the varied initial separation between different pairs of spring leaves.

As illustrated in Figs. 1 and 2, the switch 82 comprises a pair of normally open contacts 83 and 84 mounted on spring arms 85 and 86 and positioned in the path of movement of a lug 87 extending outwardly above them from the weight 31. Thus, until the separating pressure exerted between and by the probing terminals reaches 5 grams, the primary actuating circuit may be closed through the short-circuiting connection 81. Thereafter, the probing terminals being separated, the circuit is completed through the spring leaves S and S' and the relay contacts C and C' until the probe separates the latter.

The manually-operated switch 60 in the probe 10 closes not only the circuit through the trigger relay actuating coil 79 but also a parallel circuit which will now be described. Connected across the conductors 69 and 80 is a circuit 88 comprising a resistance 89 (of, say, 400 ohms) and an interlock relay actuating coil 90 in series, and a capacitance 91 connected between the resistance and the coil in parallel with the latter. The parallel circuit 88 comprises a part of the primary actuating circuit. The characteristics of the resistance 89, the inductive coil 90 and the capacitance 91 are so chosen as to assure a time delay between action of the trigger relay actuating coil 79 and action of the interlock actuating relay coil 90.

The controlled operating circuit governs the reversible motor 56 of the pump or compressor 12, and through it the pressure supplied to and released from the probe 10 and the pressure indicator 11. It also automatically locks the pressure indicator to enable the measured separating pressure to be read thereon. As illustrated in Fig. 5, this circuit comprises main conductors 92 and 93 connected to a source of 110-volt alternating current. The main conductor 92 is electrically connected, through conductor 94, to the movable trigger relay contact 95 which is moved by the armature of the trigger relay actuating coil 79.

The trigger relay contact 95 is normally closed against a second trigger relay contact 96, which is connected by conductor 97 to junction 98. Conductor 99 connects junction 98 to a second junction 100, to which is connected the anti-chatter relay coil 101 which opens contacts 76 and 77 of the primary actuating circuit when energized.

A conductor 102 connects the anti-chatter relay coil 101 to junction 103. Thence a conductor 104 leads to contact 105 of a normally open interlock relay whose armature closes contact 106 against contact 107 upon energization of the interlock relay actuating coil 90. A conductor 108 completes the circuit from contact 107 to the main conductor 93. From the foregoing, it will be evident that the controlled operating circuit just described remains open until the interlock relay coil 90 of the primary actuating circuit is energized, and that this circuit remains closed during such energization.

Connected in parallel with the circuit from junction point 100 through the anti-chatter relay coil 101 to the junction point 103, is a holding coil 109 in series with a resistance 110 of, say, 500 ohms. Holding coil 109 is the coil of magnet 44 which fixes the disc 24 in pressure-registering position.

A third trigger relay contact 111 is contacted by movable contact 95 when the latter is moved away from contact 96 by the energizing of coil 79. A conductor 112 connects contact 111 with junction 113, where conductor 114 continues the circuit to the reversible motor 56 for rotation thereof to move the piston 45 in forwardly direction. From the motor, the circuit is completed through conductor 115 to the main conductor 93 of the controlled operating circuit. It will be observed that the circuit through the motor from the third trigger relay contact 111 to the main conductor 93 is opened and closed independently of the position of the interlock relay contacts 105 and 107.

When the trigger relay actuating coil 79 is not energized and the spring actuated support 94 holds the movable trigger relay contact 95 against the contact 96, the motor reversing circuit is closed through the main controlled operating circuit conductor 92, contacts 95 and 96, conductor 97, the closed reverse limit switch 59 which is connected to the junction 98, conductor 116, junction 117, motor 56, conductor 115, and the other main conductor 93. A capacitance 118 is connected between the electrical junction points 113 and 117. As the piston 45 reaches its extreme retracted position, the reverse limit switch 59 is automatically opened, as heretofore explained, to break the motor reversing circuit. This stops the motor.

From the foregoing, operation of the automatic gauge will be readily understood. With the parts of the apparatus in the positions shown in Figs. 1, 4 and 5, the probing terminals 18 and 19 are inserted between the coacting spring leaves S and S' as closely as possible to their contact points C and C'. In this position the probing terminals may be closed, as illustrated in Fig. 1, or open, as illustrated in Fig. 5. In either case, the primary actuating circuit is short-circuited past the probe fingers 14 and 15 by the closed short-circuiting switch 82.

The push button 65 is now depressed to close the switch 60. This energizes the trigger relay actuating coil 79 which draws the movable trigger relay contact 95 against the third trigger relay contact 111, closing the controlled operating circuit through the reversible motor 56 to move the piston 45 forwardly in the compression cylinder 46. The motor now rotates to move the piston 45 forwardly on its pressure stroke. Pneumatic pressure is thereupon applied through the bladder 20 to separate the fingers 14 and 15 of the probe 10 and to raise the weight 31 of the pressure indicating unit 11. When such pressure reaches a value of 5 grams, the weight 31 is elevated sufficiently to open the short-circuiting switch 82. The primary actuating circuit is then completed through the finger 14, the probing terminal 18, the spring leaf S of the relay, the contact point C, one coacting contact point C', the second spring leaf S', the probing terminal 19 and the finger 15.

Closing the switch 60 also closes the circuit 88 and, after a time delay, energizes the interlock actuating coil 90 and closes the contacts 105 and 107 of the interlock relay. However, because the trigger relay contacts 95 and 96 are open, the anti-chatter relay coil 101 and the holding coil 109 are not energized.

At the instant when sufficient pressure is applied between the probe fingers 14 and 15 to separate the contact points C and C' of the relay, such separation breaks the primary actuating circuit. Thereupon the trigger relay actuating coil 79 is de-energized and a relay spring opens the contacts 95 and 111. The spring also returns the contact 95 to its position closing the operating circuit through the second trigger relay contact 96. Such action stops the motor and halts compressing movement of the piston 45.

It should be borne in mind at this point that breaking the circuit through the probe fingers 14 and 15 does not affect the parallel circuit 88, which remains closed as long as the switch 60 in the probe handle 13 is closed. Thus, the interlock relay points 105 and 107 remain closed until the push button 65 on the probe handle is released.

With the contact points 95 and 96 closed, the controlled operating circuit follows three parallel paths from the initial electrical junction point 98. One path includes the anti-chatter relay coil 101 which separates the contact points 76 and 77 in the primary actuating circuit. A second path includes the holding coil 109 which fixes the disc 24 in pressure registering position by energizing magnet 44. The third path is through the reversible motor 56 (the reverse limit switch 59 being in automatically closed position) to operate the motor reversely and to retract the piston 45 in the cylinder 46, thus relieving pressure at the probe 10 and the pressure indicating unit 11.

When the piston 45 is fully retracted in the cylinder 46 the reverse limit switch 59 is opened, as has already been described, breaking the circuit through the motor and stopping it. The interlock relay contacts, however, remain closed as long as the push button 65 is pressed inwardly and the switch 60 is thus held closed. Consequently, the anti-chatter relay coil 101 and the holding coil 109 remain energized. The primary actuating circuit through the probe and through the trigger relay actuating coil accordingly remains broken. Furthermore, the pressure indicating unit may now be read at any time until the push button 65 is released.

Upon release of the push button 65, the switch 60 is opened, and the interlock relay coil 90, the antichatter relay coil 101, and the holding coil 109 are de-energized. Consequently, the interlock relay contacts 105 and 107 open, the anti-chatter relay contacts close, and the weight 31 returns to its position upon the base 35 closing the short-circuiting switch 82. All of the elements of the automatic gauge are then in the positions originally described, as illustrated in Figs. 1, 4 and 5, and the gauge is ready to make and indicate a new measurement of pressure.

From the foregoing, it will be evident that an automatic pressure gauge according to the invention indicates directly the measured pressure, and makes it possible for the one using the gauge to read this pressure at his convenience.

The form of the invention here described and illustrated is merely one example of how the invention may be practiced. Other forms, embodiments and applications of the invention within the scope of the appended claims will, of course, suggest themselves to those skilled in the art.

What is claimed is:

1. An automatic gauge for measuring the pressure exerted between two resilient elements having contact points thereon, said gauge comprising: a probe for insertion between the elements adjacent their contact points and separation of such points, said probe including members separable upon application of fluid pressure therebetween; a pressure indicating unit; and a compressor for supplying equal pressure between the separable members of said probe and said unit to operate said probe and to cause said unit to indicate the operating pressure; in combination with control means actuated from said probe to govern operation of said compressor; and automatically operated means for locking said unit in pressure indicating position.

2. An automatic gauge for measuring the pressure exerted between two elements having contact points thereon, said gauge comprising: a probe for insertion between the elements adjacent their contact points and separation of such points, said probe including members separable upon application of fluid pressure therebetween; a pressure indicating unit; and a compressor for supplying equal pressure between the separable members of said probe and said unit to operate said probe and to cause said unit to indicate the operating pressure; in combination with electrical control means actuated from said probe to govern operation of said compressor; and automatically operated electrical means in the circuit of said electrical control means for locking said unit in pressure-indicating position.

3. An automatic gauge for measuring the pressure exerted between two elements having contact points thereon, said gauge comprising: a probe for insertion between the elements adjacent their contact points and separation of such points, said probe including members separable upon application of fluid pressure therebetween; a pressure indicating unit; a compressor; and a divided discharge conduit for said compressor connected to said probe and said unit to supply equal pressure between the separable members of said probe and to said unit to operate said probe and to cause said unit to indicate the operating pressure; in combination with electrical control means manually governed from said probe to actuate said compressor; and electrical control means automatically governed from said probe to lock said unit in indicating position.

4. An automatic gauge for measuring the pressure exerted between two elements having contacting points thereon, said gauge comprising: a probe for insertion between the elements adjacent their contact points and separation of such points responsive to pressure supplied thereto, said probe including members separable upon application of fluid pressure therebetween; a pressure indicating unit including a paramagnetic element operatively disposed adjacent a scale of said unit; a compressor; and a divided discharge conduit for said compressor connected to said probe and said unit to supply equal pressure between the separable members of said probe and to said unit to operate said probe and to move the paramagnetic element of said unit to indicate the operating pressure on its scale; in combination with electrical control means manually governed from said probe to actuate said compressor; and electrical control means including an electromagnet automatically governed from said probe to engage the paramagnetic element of said unit and lock said unit in indicating position.

5. An automatic gauge for measuring the presssure exerted between two electrically conductive elements having electrically conductive contact points which they press together, said gauge comprising: a handle, a pair of electrically conductive fingers carried by said handle having juxtaposed probing terminals formed at their outer ends for insertion between the said two elements adjacent their contact points; a pressure indicating unit; a compressor, a reversible motor for operating said compressor; and connections from said compressor to said handle and said pressure indicating unit for applying equal pressure between said pair of fingers and to said unit; in combination with a primary actuating circuit including said fingers; a manually-operated switch in said circuit carried by said handle; an operating circuit connected to a source of E. M. F. and to said reversible motor; a reversing switch in said operating circuit operable by said primary actuating circuit for effecting two-way operation of said motor by said operating circuit; and electromagnetic means controlled by said primary actuating circuit for holding said pressure indicating unit in indicating position.

6. An automatic gauge according to claim 5 wherein said controlled operating circuit comprises a circuit for operating said motor in reversing direction and a holding coil in parallel with said motor reversing circuit for magnetically holding said pressure indicating unit in registering position, said controlled operating circuit including contact points spring closed to close said circuit through said motor reversing circuit and said holding coil, and wherein a trigger relay actuating coil is connected in series in said primary actuating coil for drawing one of said contact points away from the other to break such circuits and into contact with a third contact point to close a circuit in forward moving direction through said motor.

7. An automatic gauge according to claim 6 wherein an automatically operated limit switch is included in the motor reversing circuit to prevent overrunning of said compressor.

8. An automatic gauge according to claim 6 wherein said primary actuating circuit also comprises a circuit parallel to that including said fingers, closed by said manually-operated switch, said parallel circuit including an interlock relay actuating coil for holding closed the circuit through said holding coil.

9. An automatic gauge according to claim 8 wherein a circuit parallel to the holding coil circuit includes an anti-chatter relay coil for opening said primary actuating circuit including said fingers.

10. An automatic gauge according to claim 5 wherein a short-circuiting connection bridges said fingers, and a spring-opened short-circuiting switch in said connection is closed by said pressure indicating unit until a predetermined pressure is measured thereby.

11. An indicating device adapted to measure fluid pressure comprising a base; an elastomeric diaphragm secured to said base; conduit means for conveying fluid pressure between said base and said diaphragm; a weight arranged to rest on said diaphragm to be raised by fluid pressure applied thereto; a movable indicating disc of paramagnetic material having a drum; means for rotatably supporting said disc; a flexible filament anchored relative to said weight and movable vertically therewith; means for maintaining tension on said filament; said filament extending from said weight around said drum and to said tension means; a scale in juxtaposition to the path of said indicator, and an electromagnet positioned adjacent said disc and adapted to lock said disc in the position it occupies upon energization of said electromagnet.

12. The device of claim 11 wherein said filament passes through said weight and is anchored to said diaphragm, whereby the weight and diaphragm are secured together.

13. An automatic gauge for measuring the pressure between electrical contact points upon two electrically conductive elements, said gauge comprising: a pair of electrically conductive fingers having their outer ends juxtaposed for insertion between such elements; fluid pressure means for separating the fingers of said pair to separate the contact points upon such elements against the contact pressure thereof; and a pressure indicator connected to said fluid pressure means for indicating the pressure exerted thereby for separating the fingers of said pair; and locking means for said indicator; in combination with an electrical circuit including said fingers and closed through such contact points upon separation of the outer ends of said fingers, said circuit also including a control switch of said fluid pressure means and the coil of an electromagnet of said locking means operatively positioned adjacent a moving part of said pressure indicator; whereby the pressure at which electrical separation of such contact points occurs may be measured and indicated.

References Cited in the file of this patent

UNITED STATES PATENTS

| | | |
|---|---|---|
| 1,818,169 | Stalder | Aug. 11, 1931 |
| 2,272,921 | Paulson | Feb. 10, 1942 |
| 2,426,583 | Bailey | Sept. 2, 1947 |
| 2,490,741 | Pashby | Dec. 6, 1949 |
| 2,578,031 | Aubrey et al. | Dec. 11, 1951 |
| 2,626,523 | Pike | Jan. 27, 1953 |
| 2,635,458 | Dickey et al. | Apr. 21, 1953 |
| 2,673,464 | Zublin | Mar. 30, 1954 |
| 2,699,060 | Safford | Jan. 11, 1955 |

FOREIGN PATENTS

| | | |
|---|---|---|
| 614,746 | Great Britain | Dec. 22, 1948 |